US009750040B2

(12) United States Patent
Ma et al.

(10) Patent No.: US 9,750,040 B2
(45) Date of Patent: Aug. 29, 2017

(54) DEVICE AND METHOD FOR SENDING WIRELESS PACKET

(71) Applicant: ZTE Corporation, Shenzhen, Guangdong (CN)

(72) Inventors: Tao Ma, Shenzhen (CN); Yi Wang, Shenzhen (CN); Jinzheng Zhao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 57 days.

(21) Appl. No.: 14/762,650

(22) PCT Filed: Sep. 18, 2013

(86) PCT No.: PCT/CN2013/083830
§ 371 (c)(1),
(2) Date: Jul. 22, 2015

(87) PCT Pub. No.: WO2014/114104
PCT Pub. Date: Jul. 31, 2014

(65) Prior Publication Data
US 2015/0365962 A1 Dec. 17, 2015

(30) Foreign Application Priority Data

Jan. 23, 2013 (CN) .......................... 2013 1 0024900

(51) Int. Cl.
H04W 72/10 (2009.01)
H04L 12/70 (2013.01)
(Continued)

(52) U.S. Cl.
CPC ............ H04W 72/10 (2013.01); H04L 47/00 (2013.01); H04W 24/08 (2013.01); H04W 72/02 (2013.01);
(Continued)

(58) Field of Classification Search
CPC .... H04W 72/10; H04W 72/085; H04W 24/08
See application file for complete search history.

(56) References Cited

U.S. PATENT DOCUMENTS 7,509,131 B2 3/2009 Krumm
2006/0046709 A1 3/2006 Krumm
(Continued)

FOREIGN PATENT DOCUMENTS

CN 1901489 A 1/2007
CN 101247326 A 8/2008
(Continued)

OTHER PUBLICATIONS

International Search Report in international application No. PCT/CN2013/083830, mailed on Dec. 12, 2013.
(Continued)

Primary Examiner — Jamal Javaid
(74) Attorney, Agent, or Firm — Oppedahl Patent Law Firm LLC

(57) ABSTRACT

A method for sending a wireless packet is described. A signal strength of a client is acquired. A priority queue to which the client belongs is set according to the signal strength of the client. A priority of a wireless packet to be sent to the client is set according to the priority queue so as to send the set wireless packet. In the meanwhile, a device for sending a wireless packet is also described. The disclosure can be utilized to put a wireless packet sent to a remote client (STA) having a weak signal into a low priority service queue and put a wireless packet sent to a close STA having a strong signal strength into a high priority service queue, so as to ensure data transmission of the close STA having a good signal and reduce the impact of the remote STA having a weak signal on the performance of the whole wireless network, thus improving reasonable allocation of wireless network resources and the Quality of Service (QoS) of the (Continued)

wireless network to further improve the satisfaction of user experience.

7 Claims, 2 Drawing Sheets

(51) Int. Cl.
*H04W 72/02* (2009.01)
*H04W 24/08* (2009.01)
*H04W 72/08* (2009.01)
*H04W 72/12* (2009.01)

(52) U.S. Cl.
CPC ...... *H04W 72/085* (2013.01); *H04W 72/1231* (2013.01)

(56) References Cited

U.S. PATENT DOCUMENTS

| | | |
|---|---|---|
| 2007/0002866 A1 | 1/2007 | Belstner |
| 2007/0117570 A1* | 5/2007 | Noh ................. H04L 1/0026 455/452.2 |
| 2011/0275399 A1* | 11/2011 | Englund ........... H04W 72/1231 455/513 |
| 2014/0226502 A1* | 8/2014 | Behnamfar ............... H04L 1/00 370/252 |

FOREIGN PATENT DOCUMENTS

| | | |
|---|---|---|
| CN | 101895907 A | 11/2010 |
| CN | 101917345 A | 12/2010 |
| CN | 102075440 A | 5/2011 |
| CN | 102131300 A | 7/2011 |
| CN | 103124432 A | 5/2013 |
| EP | 2475141 A1 | 7/2012 |

OTHER PUBLICATIONS

English Translation of the Written Opinion of the International Search Authority in international application No. PCT/CN2013/083830, mailed on Dec. 12, 2013.

Supplementary European Search Report in European application No. 13873083.3, mailed on Nov. 30, 2015.

Opportunistic scheduling for WLAN systems using cross-layer techniques and a distributed MAC, mailed on Sep. 28, 2005.

* cited by examiner

DEVICE AND METHOD FOR SENDING WIRELESS PACKET

TECHNICAL FIELD

The disclosure relates to the field of Wireless Local Area Network (WLAN) communications, and particularly to a device and method for sending a wireless packet.

BACKGROUND

With the rapid development of WLAN technologies, more and more Access Points (AP) in WLANs deployed by major telecommunications operators have emerged in public places including airports, hospitals, schools, libraries and communities and so on. People can use mobile devices such as mobile phones, Personal Digital Assistants (PDA), laptops and the like conveniently in work and life to access the Wireless Fidelity (WiFi) hotspots to surf the Internet. However, dozens of Internet users may access a WLAN AP simultaneously in a crowded public place. These users compete with each other to share limited network bandwidth resources, which may result in a low Internet speed and bad network experience.

A working group of the Institute of Electrical and Electronics Engineers (IEEE) puts forward an IEEE 802.11e standard in order to improve support for the Quality of Service (QoS) of a Media Access Control (MAC) layer in an 802.11 standard. All services have the same priority in the traditional 802.11 standard while a priority is set in the 802.11e standard to enhance QoS support of the 802.11 standard so as to ensure the QoS of a service having a high priority. However, the priority is mainly set according to a service type in 802.11e. Therefore, when a service having a high priority needs to be executed, the service will be executed preferentially regardless of a signal strength of a client (i.e., STA) initiating the service. Hence, a service initiated by a remote STA having a weak signal will be executed first even if the STA initiating the service is in a remote wireless environment having a weak signal while another closer STA having a better signal strength initiates a service having a relatively low priority. Such a processing mechanism will inevitably affect utilization of resources of the whole wireless network and reduce the QoS of the wireless network to further reduce the satisfaction of user experience.

SUMMARY

A major technical problem to be solved by embodiments of the disclosure is to provide a device and method for sending a wireless packet to solve a problem that an existing priority setting results in unreasonable allocation of resources of a wireless network and bad QoS of the wireless network and reduces the satisfaction of user experience.

An embodiment of the disclosure provides a method for sending a wireless packet in order to solve the technical problem. The method includes that:

acquiring a signal strength of a client, and setting, according to the signal strength of the client, a priority queue to which the client belongs;

setting, according to the priority queue, a priority of a wireless packet to be sent to the client;

sending the set wireless packet.

In the solution, the acquiring the signal strength of the client may include:

receiving a wireless packet sent by the client;

acquiring a current signal strength value of the client according to the received wireless packet;

accordingly, the setting, according to the signal strength of the client, the priority queue to which the client belongs comprises:

adjusting in real time, according to the current signal strength value of the client, a priority queue to which the client belongs currently.

In the solution, the wireless packet may include: an association request packet, a management packet, a control packet and/or a data packet sent by a client.

In the solution, the method may further include:

adjusting a Wireless MultiMedia (WMM) parameter of the priority queue according to a background noise of a wireless network environment;

accordingly, the sending the set wireless packet comprises:

sending the wireless packet according to the priority and a current WMM parameter of the priority queue.

In the solution, the adjusting the WMM parameter of the priority queue according to the background noise of the wireless network environment may include:

judging whether a background noise process is triggered, and when it is judged that the background noise process is triggered, acquiring a background noise in a current wireless environment;

adjusting the WMM parameter of the priority queue according to the acquired background noise.

An embodiment of the disclosure further provides a device for sending a wireless packet in order to solve the technical problem. The device includes: a signal strength acquisition module, a wireless station management module and a wireless packet sending module, wherein the signal strength acquisition module is configured to acquire a signal strength of a client;

the wireless station management module is configured to set, according to the signal strength of the client, a priority queue to which the client belongs;

the wireless packet sending module is configured to set, according to the priority queue, a priority of a wireless packet to be sent to the client and send the set wireless packet.

In the solution, the signal strength acquisition module may include: a wireless packet receiving sub-module and a signal strength value acquisition sub-module, wherein the wireless packet receiving sub-module is configured to receive a wireless packet sent by the client;

the signal strength value acquisition sub-module is configured to acquire, according to the wireless packet received by the wireless packet receiving sub-module, a current signal strength value of the client;

accordingly, the wireless station management module is configured to adjust in real time, according to the current signal strength value of the client, a priority queue to which the client belongs currently.

In the solution, the device may further include a Wireless MultiMedia (WMM) parameter adjusting module;

the WMM parameter adjusting module is configured to adjust a WMM parameter of the priority queue according to a background noise of a wireless network environment;

accordingly, the wireless packet sending module is configured to send the wireless packet according to the priority and a current WMM parameter of the priority queue.

In the solution, the WMM parameter adjusting module may include: a background noise process triggering sub-module, a background noise acquisition sub-module and a WMM parameter setting sub-module, wherein the background noise process triggering sub-module is configured to generate a trigger signal of a background noise process;

the background noise acquisition sub-module is configured to acquire a background noise in a current wireless environment according to the trigger signal of the background noise process;

the WMM parameter setting sub-module is configured to adjust the WMM parameter of the priority queue according to the background noise acquired by the background noise acquisition sub-module.

The embodiments of the disclosure have the following beneficial effect.

A device and method for sending a wireless packet according to the embodiments of the disclosure acquire a signal strength of a client, set, according to the signal strength of the client, a priority queue to which the client belongs, then set, according to the priority queue, a priority of a wireless packet to be sent to the client to further send the set wireless packet. That is, the embodiments of the disclosure set, according to current signal strengths of clients, a priority of a wireless packet sent to each client. For example, a wireless packet sent to a remote client (STA) having a weak signal may be put into a low priority service queue while a wireless packet sent to a close having a strong signal strength is put into a high priority service queue, so as to ensure data transmission of the close STA having a good signal and reduce the impact of the remote STA having a weak signal on the performance of the whole wireless network. Thus, wireless network resources may be allocated more reasonably and the QoS of the wireless network may be improved to further improve the satisfaction of user experience by utilizing solutions provided by the embodiments of the disclosure.

Preferably, the solutions provided by the embodiments of the disclosure may adjust a WMM parameter of each priority according to a background noise condition of a wireless network environment, thereby further ensuring data transmission of the remote STA having a good signal, improving the QoS of the wireless network and improving the satisfaction of user experience.

DETAILED DESCRIPTION

The embodiments of the disclosure configure a priority of a data packet of each client (STA) according to a signal strength of the STA associated with an AP, and may further finely adjust a Wireless MultiMedia (WMM) parameter (including a contention window minimum (cwmin), a contention window maximum (cwmax), an arbitration inter frame space number (aifsn), a transmission opportunity limit (txoplimit) and so on) of each priority queue in real time according to a background noise condition of a wireless environment, so as to ensure data transmission of a close STA having a good signal, reducing the impact of a remote STA having a weak signal on the performance of the whole wireless network, thereby achieving purposes of improving the quality of the wireless network and the satisfaction of user Internet experience. The disclosure will be further expounded hereinafter through specific embodiments in combination with the drawings.

Figure 1:
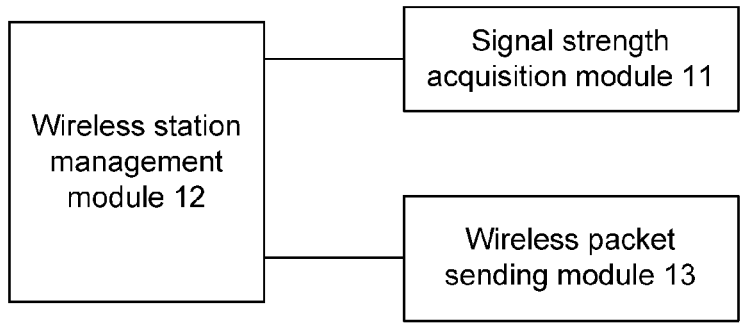
FIG. 1 is a first structural diagram of components of a device for sending a wireless packet according to an embodiment of the disclosure.

Referring to FIG. 1, a device for sending a wireless packet in the present embodiment includes a signal strength acquisition module 11, a wireless station management module 12 and a wireless packet sending module 13, wherein the signal strength acquisition module 11 is configured to acquire a signal strength of a client (i.e., STA); the STA here may refer to an STA associated by an AP and the signal strength of the STA may be specifically acquired by acquiring a wireless packet sent by the STA in the present embodiment;

the wireless station management module 12 is configured to set, according to the signal strength of the STA, a priority queue to which the STA belongs;

the wireless packet sending module 13 is configured to set, according to the priority queue to which the client belongs, a priority of a wireless packet to be sent to the client and send the set wireless packet. The wireless packet sending module 13 in the present embodiment may specifically deliver an instruction to a wireless driving module (not shown in the figure), and the packet is sent via the wireless driving module.

Thus, the present embodiment sets, according to a current signal strength of each client, a priority of a wireless packet sent to each said client. A wireless packet sent to a remote STA having a weak signal may be put into a low priority service queue while a wireless packet sent to a close STA having a strong signal strength is put into a high priority service queue, so as to ensure data transmission of the close STA having a good signal and reduce the impact of the remote STA having a weak signal on the performance of the whole wireless network, thus improving the QoS of the wireless network to further improve the satisfaction of user experience.

It is worth noting that a setting of a priority queue of each STA in the present embodiment may be adjusted in real time, and may be also adjusted in a non-real time manner. Description will be provided below by taking real-time adjustment as an example to provide better understanding.

Figure 2:
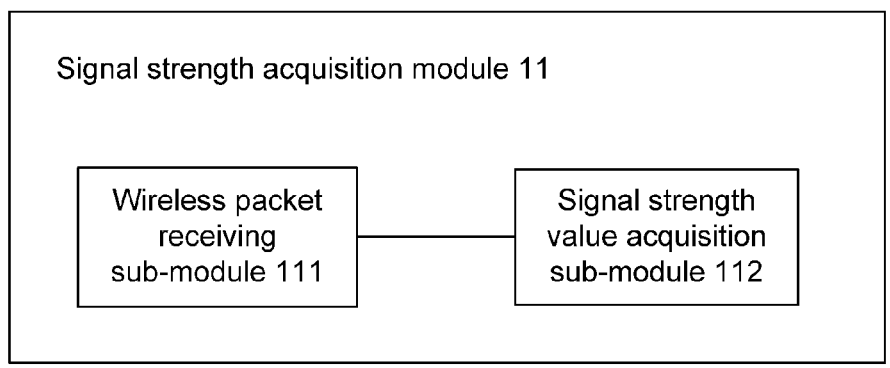
FIG. 2 is a structural diagram of components of a signal strength acquisition module according to an embodiment of the disclosure.

Referring to FIG. 2, the signal strength acquisition module 11 in the present embodiment includes a wireless packet receiving sub-module 111 and a signal strength value acquisition sub-module 112. When the priority queue is adjusted in real time, the wireless packet receiving sub-module 111 is configured to receive a wireless packet sent by the client. The wireless packet may be any packet sent by the client. For example, the wireless packet may be a management packet, a control packet, or a data packet and so on.

The signal strength value acquisition sub-module 112 is configured to acquire, according to the wireless packet received by the wireless packet receiving sub-module 111, a current signal strength value of the client sending the packet, and send the acquired signal strength value to the wireless station management module 12. Specifically, the signal strength value acquisition sub-module 112 acquires a current signal strength of the STA by parsing various received packets.

Accordingly, the wireless station management module 12 adjusts in real time, according to the current signal strength value of the client, a priority queue to which the client belongs currently.

That is, when a priority queue of an STA is adjusted in real time, each time when the wireless packet receiving sub-module 111 receives a wireless packet sent by an STA, the signal strength value acquisition sub-module 112 will acquire a signal strength value of the STA again and send the signal strength value to the wireless station management module 12, while the wireless station management module 12 updates a current signal strength value of a corresponding STA each time after a signal strength value is received, and further adjusts, according to the signal strength value, a priority queue to which the STA belongs.

It is worth noting that, before setting a priority queue of each STA according to a signal strength value, the wireless station management module 12 in the present embodiment is further configured to create, maintain, count and process a packet related to the STA after receiving an association request packet received by the signal strength acquisition module 11, specifically the wireless packet receiving sub-module 111, including creation of a structural variable of the STA and initiation of related state information of the STA and so on.

When adjusting the priority queue of the STA according to the signal strength value, the wireless station management module 12 of the present embodiment may specifically judge, according to the current signal strength value, whether the priority queue of the STA changes, and if yes, then it performs adjustment, otherwise, it does not perform adjustment. The process will not be described repeatedly in the present embodiment.

Figure 3:
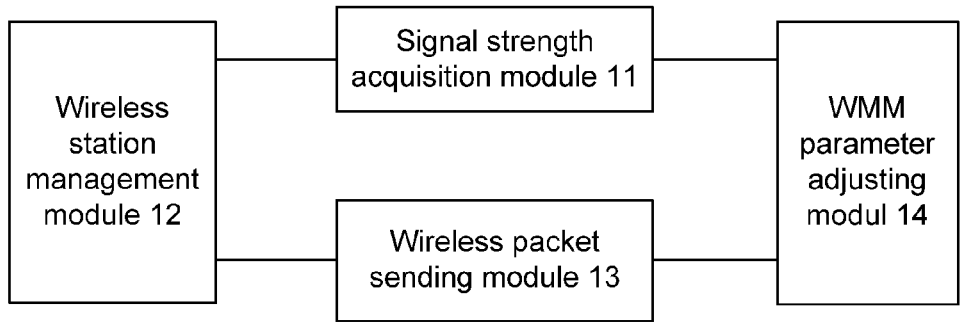
FIG. 3 is a second structural diagram of components of a device for sending a wireless packet according to an embodiment of the disclosure.

Referring to FIG. 3, the device for sending a wireless packet in the present embodiment further includes a WMM parameter adjusting module 14. The WMM parameter adjusting module 14 is configured to adjust a WMM parameter of each priority queue according to a background noise of a wireless network environment. When the wireless packet sending module 13 sends the wireless packet, the wireless packet may be also sent according a current WMM parameter of the priority queue corresponding to the wireless packet besides according to the set priority, which can further ensure data transmission of the close STA having a good signal and improve the QoS of the wireless network and the satisfaction of user experience.

Figure 4:
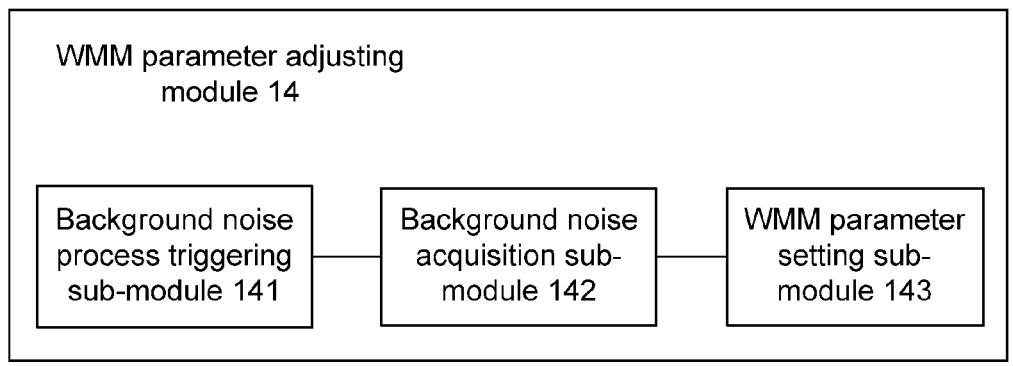
FIG. 4 is a structural diagram of components of a WMM parameter adjusting module according to an embodiment of the disclosure.

Referring to FIG. 4, the WMM parameter adjusting module 14 in the present embodiment includes: a background noise process triggering sub-module 141, a background noise acquisition sub-module 142 and a WMM parameter setting sub-module 143, wherein the background noise process triggering sub-module 141 is configured to generate a trigger signal of a background noise process; and send the trigger signal of the background noise process to the background noise acquisition sub-module 142. The background noise process triggering sub-module 141 in the present embodiment may be specifically a wireless timer module. The trigger signal of the background noise process may be an interruption signal. For example, it may be set that the wireless timer module generates an interruption signal, i.e. a trigger signal of a background noise process, every 1 second.

The background noise acquisition sub-module 142 is configured to acquire a background noise in a current wireless environment according to the trigger signal of the background noise process. The process includes that the background noise acquisition sub-module 142 acquires the background noise in the current wireless environment via reading an internal register of a wireless chip, and sends an acquisition result to the WMM parameter setting sub-module 143.

The WMM parameter setting sub-module 143 is configured to adjust the WMM parameter of the corresponding priority queue according to the background noise acquired by the background noise acquisition sub-module 142.

It is worth noting that all foregoing functions of the background noise acquisition sub-module 142 and the WMM parameter setting sub-module 143 in the present embodiment may be implemented directly through an existing wireless driving module.

In practical application, the signal strength acquisition module 11, the wireless station management module 12, the wireless packet sending module 13, the wireless packet receiving sub-module 111 and the signal strength value acquisition sub-module 112 may be all implemented by a Central Processing Unit (CPU), or a Digital Signal Processor (DSP) or a Field Programmable Gate Array (FPGA) and so on. The CPU, DSP FPGA may be all located at a network side.

Figure 5:
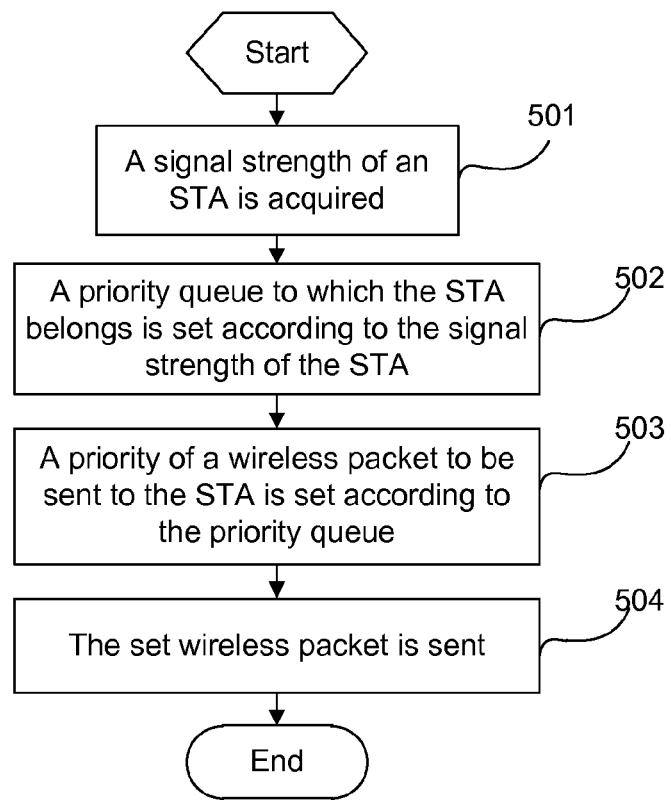
FIG. 5 is a schematic diagram of a wireless packet sending process according to an embodiment of the disclosure.

Description will be provided below in combination with a specific method process as an example in order to better understand the disclosure. Referring to FIG. 5:

Step 501: A signal strength of an STA is acquired. Specifically, the signal strength of each STA is acquired according to a wireless packet sent by the STA, and a specific acquisition method will not be described repeatedly here.

Step 502: A priority queue to which the STA belongs is set according to the signal strength of the STA. A specific setting method has been expounded above and will not be described repeatedly here.

Step 503: A priority of a wireless packet to be sent to the STA is set according to the priority queue.

Step 504: The set wireless packet is sent.

Figure 6:
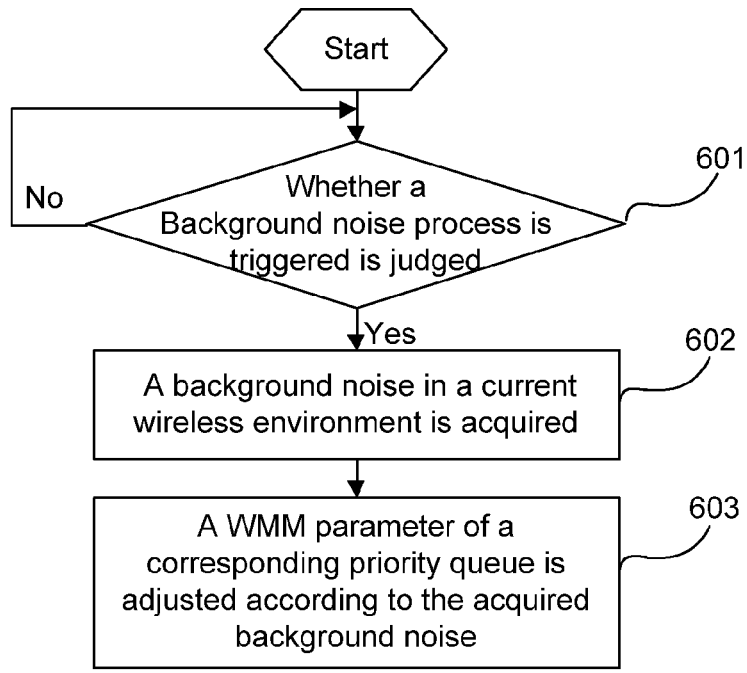
FIG. 6 is a schematic diagram of a WMM parameter process of a priority queue according to an embodiment of the disclosure.

Referring to FIG. 6, a process of adjusting a WMM parameter of a priority queue in the present embodiment is as follows.

Step 601: Whether a background noise process is triggered is judged. That is, whether a wireless timer module generates an interruption signal is judged. If yes, then the wireless timer module is reset after generating the interruption signal, and performs timing again, and step 602 is performed. Otherwise, judgment is continued.

Step 602: A background noise in a current wireless environment is acquired.

Step 603: A WMM parameter of a corresponding priority queue is adjusted according to the acquired background noise.

In the present embodiment, a wireless packet may be specifically sent in combination with a priority queue to which an STA belongs currently and a WMM parameter of the priority queue when the wireless packet is sent. That is, combining the two processes as shown in FIG. 5 and FIG. 6, implementation of a bottom layer may still follow IEEE802.11e while an upper layer sends a packet to a corresponding STA through the foregoing steps.

Thus, the embodiments of the disclosure set, according to a signal strength of a client, a priority queue to which the client belongs, and then set, according to the priority queue, a priority of a wireless packet to be sent to the client to further send the set wireless packet, so as to ensure data transmission of a close STA having a strong signal and reduce the impact of a remote STA having a weak signal on the performance of the whole wireless network. Thus wireless network resources may be allocated more reasonably and the QoS of the wireless network may be improved to further improve the satisfaction of user experience by utilizing the solutions provided by the embodiments of the disclosure.

In the meanwhile, the embodiments of the disclosure may further adjust a WMM parameter of each priority according to a background noise condition of a wireless network environment, thereby further ensuring data transmission of the remote STA having a good signal, improving the QoS of the wireless network and improving the satisfaction of user experience.

The forgoing content is provided for further describing the disclosure in details in combination with specific embodiments and it shall not be construed that specific implementation of the disclosure is limited to these descriptions. For those of ordinary skill in the art, several simple deductions or replacements may be further made without departing from the conception of the disclosure, and these deductions or replacements should be considered as belonging to the protection scope of the disclosure.

What is claimed is:

1. A method for sending a wireless packet, comprising:
    acquiring a signal strength of a client, and setting, according to the signal strength of the client, a priority queue to which the client belongs;
    setting, according to the priority queue, a priority of a wireless packet to be sent to the client;
    sending the set wireless packet;
    further comprising: adjusting a Wireless MultiMedia (WMM) parameter of the priority queue according to a background noise of a wireless network environment;
    accordingly, the sending the set wireless packet comprises: sending the wireless packet according to the priority and a current WMM parameter of the priority queue.

2. The method for sending a wireless packet according to claim 1, wherein the acquiring the signal strength of the client comprises:
    receiving a wireless packet sent by the client;
    acquiring a current signal strength value of the client according to the received wireless packet;
    accordingly, the setting, according to the signal strength of the client, the priority queue to which the client belongs comprises:
    adjusting in real time, according to the current signal strength value of the client, a priority queue to which the client belongs currently.

3. The method for sending a wireless packet according to claim 2, wherein the wireless packet comprises: an association request message, a management message, a control message and/or a data message sent by a client.

4. The method for sending a wireless packet according to claim 1, wherein the adjusting the WMM parameter of the priority queue according to the background noise of the wireless network environment comprises:
    judging whether a background noise process is triggered, and when it is judged that the background noise process is triggered, acquiring a background noise in a current wireless environment;
    adjusting the WMM parameter of the priority queue according to the acquired background noise.

5. A device for sending a wireless packet, comprising a wireless transceiver, and a processor, wherein the wireless transceiver is configured to acquire a signal strength of a client;
    the processor is configured to set, according to the signal strength of the client, a priority queue to which the client belongs;
    the wireless transceiver is also configured to set, according to the priority queue, a priority of a wireless packet to be sent to the client and send the set wireless packet;
    further comprising a Wireless MultiMedia (WMM) parameter adjuster; the WMM parameter adjuster is configured to adjust a WMM parameter of the priority queue according to a background noise of a wireless network environment;
    accordingly, the wireless transceiver is configured to send the wireless packet according to the priority and a current WMM parameter of the priority queue.

6. The device for sending a wireless packet according to claim 5, wherein the wireless transceiver
    is also configured to receive a wireless packet sent by the client and
    acquire, according to the received wireless packet, a current signal strength value of the client;
    accordingly, the processor is configured to adjust in real time, according to the current signal strength value of the client, a priority queue to which the client belongs currently.

7. The device for sending a wireless packet according to claim 5, wherein the WMM parameter adjuster
    is also configured to generate a trigger signal of a background noise process,
    acquire a background noise in a current wireless environment according to the trigger signal of the background noise process,
    and adjust the WMM parameter of the priority queue according to the acquired background noise.

* * * * *